United States Patent
Ushiwata et al.

(10) Patent No.: US 8,335,415 B2
(45) Date of Patent: Dec. 18, 2012

(54) MIRROR-EMBEDDED LIGHT TRANSMISSION MEDIUM AND FABRICATION METHOD OF SAME

(75) Inventors: Takami Ushiwata, Hitachi (JP); Kouki Hirano, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 412 days.

(21) Appl. No.: 12/576,258

(22) Filed: Oct. 9, 2009

(65) Prior Publication Data

US 2010/0092143 A1    Apr. 15, 2010

(30) Foreign Application Priority Data

Oct. 9, 2008 (JP) ................................ 2008-263042
Jan. 9, 2009 (JP) ................................ 2009-003381

(51) Int. Cl.
G02B 6/26 (2006.01)
G02B 6/42 (2006.01)

(52) U.S. Cl. ................ 385/47; 385/14; 385/15; 385/31; 385/44; 385/129

(58) Field of Classification Search .................... 385/14, 385/15, 31, 44, 129, 47
See application file for complete search history.

(56) References Cited

U.S. PATENT DOCUMENTS

| | | | |
|---|---|---|---|
| 4,378,143 A | 3/1983 | Winzer | |
| 5,177,859 A | 1/1993 | Froning et al. | |
| 5,999,670 A | 12/1999 | Yoshimura et al. | |
| 6,913,705 B2 | 7/2005 | Nakata | |
| 6,952,504 B2 | 10/2005 | Bi et al. | |
| 7,202,007 B2 * | 4/2007 | Shibata et al. ................. 430/199 |
| 2001/0035083 A1 * | 11/2001 | Fasanella et al. ................ 83/881 |
| 2002/0028045 A1 * | 3/2002 | Yoshimura et al. ............. 385/50 |
| 2002/0039475 A1 | 4/2002 | Furuyama | |
| 2002/0051599 A1 | 5/2002 | Tsukamoto et al. | |
| 2004/0234224 A1 | 11/2004 | Ishizaki et al. | |
| 2005/0041906 A1 | 2/2005 | Sugama et al. | |
| 2005/0117833 A1 | 6/2005 | Fukuzawa et al. | |
| 2009/0046978 A1 * | 2/2009 | Yasuda et al. ................... 385/31 |
| 2009/0067799 A1 | 3/2009 | Nakane | |

FOREIGN PATENT DOCUMENTS

| | | |
|---|---|---|
| JP | 50-155243 | 12/1975 |
| JP | 10-300961 | 11/1998 |
| JP | 2006-184773 | 7/2006 |
| JP | A-2007-219143 | 8/2007 |
| JP | A-2007-293108 | 11/2007 |
| JP | 2008-304615 | 12/2008 |

OTHER PUBLICATIONS

Japanese Office Action dated Jun. 5, 2012; Application No. JP 2009-003381.

* cited by examiner

*Primary Examiner* — Jack Berman
*Assistant Examiner* — Meenakshi Sahu
(74) *Attorney, Agent, or Firm* — Antonelli, Terry, Stout & Kraus, LLP.

(57) ABSTRACT

A mirror-embedded light transmission medium according to the present invention comprises: a light transmission medium including a light transmission layer, light being transmitted through the light transmission layer; a rough surface which terminates the light transmission layer, a direction of the rough surface being parallel or oblique to a light transmission direction of the light transmission layer; a reflection enhancing layer that adherently covers the rough surface; and a smooth surface formed over the reflection enhancing layer, the smooth surface reflecting the light transmitted through the light transmission layer.

20 Claims, 9 Drawing Sheets

LIGHT TRANSMISSION DIRECTION

MIRROR-EMBEDDED LIGHT TRANSMISSION MEDIUM AND FABRICATION METHOD OF SAME

CLAIM OF PRIORITY

The present application claims priority from Japanese patent application serial no. 2009-003381 filed on Jan. 9, 2009, which further claims priority from Japanese patent application serial no. 2008-263042 filed on Oct. 9, 2008, the contents of which are hereby incorporated by reference into this application.

BACKGROUND OF THE INVENTION

1. Field of the Invention

The present invention relates to mirror-embedded light transmission media and fabrication methods thereof, which offer excellent characteristics in terms of cost, mass production and reliability.

2. Description of Related Art

With the recent development of information and communication technology typified by the Internet as well as a recent dramatic increase in processor speeds, there has been a growing demand for the transmission of high volume data such as image and motion video. In such high volume data transmissions, there is a demand for transmission rates of 10 Gbps or more as well as a small effect of electromagnetic noise. Among such high-speed communications, optical transmissions, which are not affected by electromagnetic noise, have shown great promise. In this context, conventionally employed electrical transmissions using metal cables and wiring are being replaced by optical transmissions using optical fibers and waveguides.

Mainly in order to reduce the mounting costs in such optical transmission systems, there has been proposed an optical waveguide that mounts therein a photonic device (such as a surface light emitting device and a surface light receiving device) in parallel to its core. In this technology, the optical path needs to be deflected approximately 90° in order to optically couple the core and the photonic device. A means for realizing this is to form a V-groove in the core by cutting or dicing and to fabricate a mirror on an angled surface of the V-groove. For example, such a mirror is provided by reflection at the bare angled surface formed in the waveguide and, in this case, its reflectivity is determined from the refractive index difference between the air and the waveguide (core) material. Another method of forming such a mirror is to form a metal film on the above-mentioned bare angled surface by vapor depositing a metal such as gold (for these methods e.g., see JP-A Hei 10 (1998)-300961).

In the above methods, an optical fiber may be used instead of a waveguide. In this case, similarly, a V-groove is formed, by dicing or the like, in an optical fiber mounted on a substrate. Then, a mirror is formed in the core of the optical fiber by utilizing an oblique surface of the V-groove. Hereinafter, an optical waveguide and an optical fiber are collectively referred to as a light transmission medium.

However, the mirror utilizing the bare surface cut by means of, e.g., a dicing blade has a surface roughness (many projections and depressions), and therefore has a problem of increased light reflection loss (mirror loss) due to degraded reflection efficiency. In particular, when a soft material is cut like that, the resulting cut surface tends to be comparatively rougher. Hence, when a flexible optical waveguide or a flexible optical fiber is processed by dicing, the resulting diced surface is remarkably rough.

On the other hand, the mirror provided by the metal-deposited surface has problems with cost because the number of waveguides loadable in a vapor deposition chamber becomes limited with increasing size of the waveguide. Furthermore, a vapor-deposited metal film generally has poor adhesiveness to an optical waveguide material, thus posing a problem of peeling.

SUMMARY OF THE INVENTION

Under these circumstances, it is an objective of the present invention to solve the above problems and to provide a mirror-embedded light transmission medium with excellent optical characteristics and reliability. Furthermore, it is another objective of the present invention to provide a fabrication method thereof, which offers advantages in terms of cost and mass production.

(1) According to one aspect of the present invention, there is provided a mirror-embedded light transmission medium, which comprises: a light transmission medium including a light transmission layer, light being transmitted through the light transmission layer; a rough surface which terminates the light transmission layer, a direction of the rough surface being parallel or oblique to a light transmission direction of the light transmission layer; a reflection enhancing layer that adherently covers the rough surface; and a smooth surface formed over the reflection enhancing layer, the smooth surface reflecting the light transmitted through the light transmission layer.

In the above aspect (1) of the present invention, the following modifications and changes can be made.

(i) The light transmission medium is mounted on a substrate in such a manner that the light transmission direction is parallel to a surface of the substrate. In other words, the light transmission direction is perpendicular to a direction of a surface of the substrate.

(ii) The direction of the rough surface is parallel to the light transmission direction of the light transmission layer.

(iii) The direction of the rough surface is oblique (but not perpendicular nor parallel) to the light transmission direction of the light transmission layer.

(iv) Refractive index difference between the reflection enhancing layer and the light transmission layer is within ±0.1.

(v) The reflection enhancing layer is made of a thermoset resin or a photocurable resin.

(vi) The reflection enhancing layer is made of a thermoplastic resin.

(vii) The mirror-embedded light transmission medium further comprises a light reflecting film that covers the smooth surface, the light reflecting film being a metal film or a multilayer film.

(viii) The light transmission medium is an optical waveguide or an optical fiber.

(ix) Modulus of elasticity of the light transmission layer is 1 GPa or less.

(2) According to another aspect of the present invention, there is provided a fabrication method of a mirror-embedded light transmission medium which comprises a light transmission layer for transmitting light therethrough. This fabrication method includes the steps of: forming a rough surface for terminating the light transmission layer by cutting, a direction of the rough surface being parallel or oblique to a light transmission direction of the light transmission layer; forming a reflection enhancing layer that adherently covers the rough surface; and forming a smooth surface over the reflection enhancing layer, the smooth surface reflecting the light transmitted through the light transmission layer.

In the above aspect (2) of the present invention, the following modifications and changes can be made.

(x) The step of forming the smooth surface includes the step of shaping the reflection enhancing layer by means of a shaping member having a smooth surface.

In the above modification (x) of the aspect (2) of the present invention, the following modifications and changes can be made.

(xi) The step of forming the smooth surface further includes the step of removing the shaping member from the reflection enhancing layer.

(xii) The step of forming the smooth surface further includes the steps of: preapplying a light reflecting film over the smooth surface of the shaping member; transferring the preapplied light reflecting film onto the exposed surface of the reflection enhancing layer; and removing the shaping member from the transferred light reflecting film.

ADVANTAGES OF THE INVENTION

The invention offers excellent advantages as follows: There is provided a mirror-embedded light transmission medium with excellent optical characteristics and reliability. Furthermore, there is provided a fabrication method of a mirror-embedded light transmission medium, which offers advantages in terms of cost and mass production.

DETAILED DESCRIPTION OF THE PREFERRED EMBODIMENTS

A preferred embodiment of the present invention will be described below with reference to the accompanying drawings. However, the present invention is not limited to the embodiment described herein. As used herein, the term "oblique" means neither perpendicular nor parallel.

Figure 1:
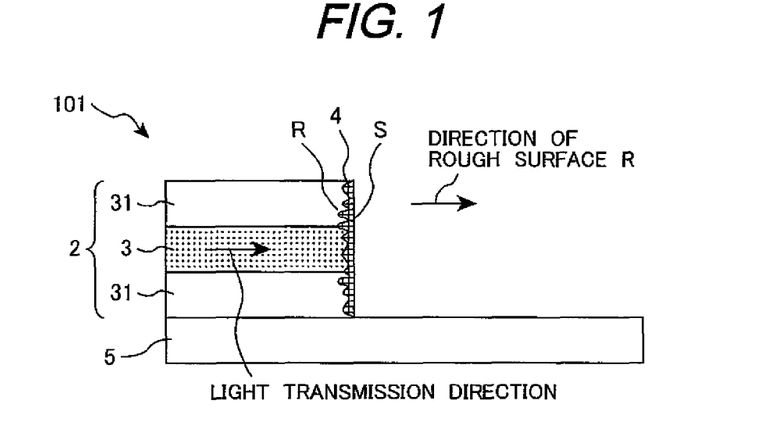
FIG. 1 is a schematic illustration showing a cross-sectional view of a mirror-embedded light transmission medium according to an embodiment of the present invention.
Figure 2:
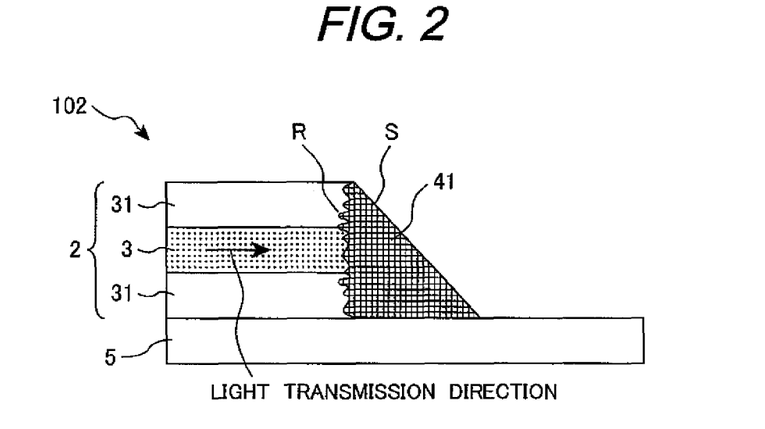
FIG. 2 is a schematic illustration showing a cross-sectional view of a mirror-embedded light transmission medium according to another embodiment of the present invention.
Figure 3:
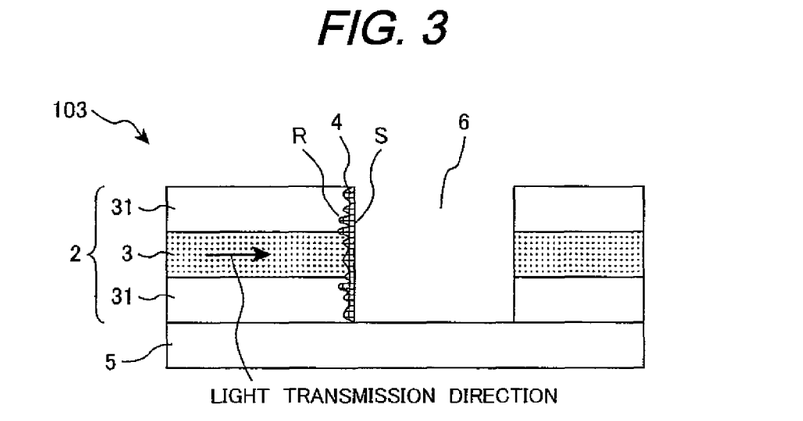
FIG. 3 is a schematic illustration showing a cross-sectional view of a mirror-embedded light transmission medium according to still another embodiment of the present invention.

Each of FIGS. 1 through 6 is a schematic illustration showing a cross-sectional view of a mirror-embedded light transmission medium according to an embodiment of the present invention. As illustrated in FIGS. 1 to 3, each of mirror-embedded light transmission media 101, 102 and 103 according to the present invention comprises: a light transmission medium 2 including a light transmission layer 3 through which light is transmitted and a support member 31; a rough surface R for terminating at least the light transmission layer 3 that is formed to be perpendicular or oblique to the light transmission layer 3; a reflection enhancing layer (4 or 41) which adherently covers the rough surface R; and a smooth surface S that is formed over the layer (4 or 41) and that reflects the light transmitted through the light transmission layer 3. This smooth surface S serves as a reflective surface of a mirror. Thus, the reflection enhancing layer (4 or 41) having thereover the smooth surface S as the reflective surface is disposed at a point along the light transmission direction of the light transmission layer 3, thereby forming a mirror converting the light transmission direction. The light transmission medium 2 is mounted on a substrate 5 in such a manner that the light transmission layer 3 is parallel to a surface of the substrate 5. Besides, the rough surface R is illustrated exaggeratedly in the drawings for easy understanding.

Figure 4:
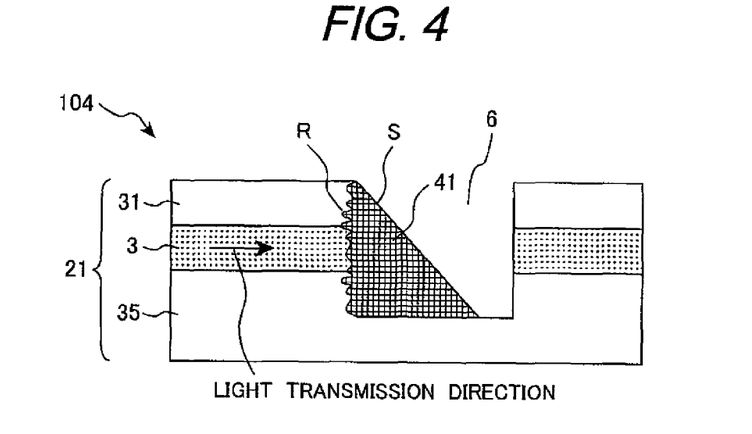
FIG. 4 is a schematic illustration showing a cross-sectional view of a mirror-embedded light transmission medium according to still another embodiment of the present invention.
Figure 5:
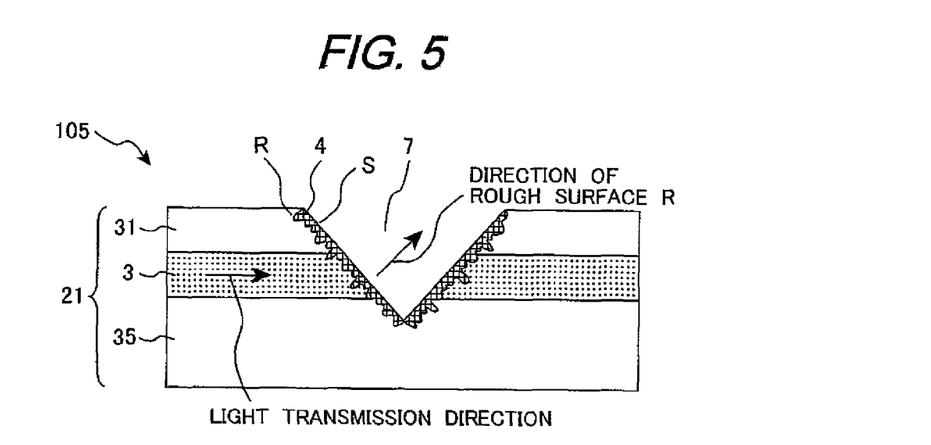
FIG. 5 is a schematic illustration showing a cross-sectional view of a mirror-embedded light transmission medium according to still another embodiment of the present invention.
Figure 6:
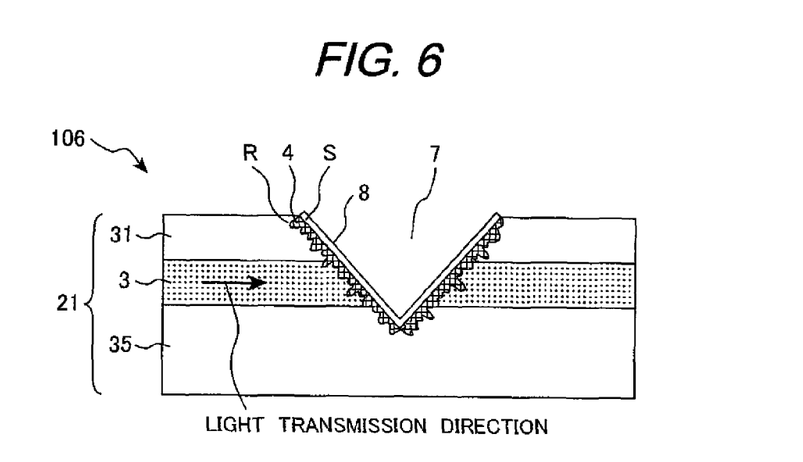
FIG. 6 is a schematic illustration showing a cross-sectional view of a mirror-embedded light transmission medium according to still another embodiment of the present invention.

In the mirror-embedded light transmission media 104, 105 and 106 illustrated in FIGS. 4 to 6, part of the light transmission medium 21 (specifically, part of the support member 31) serves as the substrate, denoting a support member 35, so that the light transmission medium and the substrate are integrally formed. The rough surface R, the reflection enhancing layer (4 or 41), and the smooth surface S comprise the mirror-embedded light transmission media 104 to 106 in the same manner as the mirror-embedded light transmission media 101 to 103. Needless to say, the configurations of the mirror-embedded light transmission media 104 to 106 illustrated in FIGS. 4 to 6 can also be achieved by forming the light transmission medium 2 and the substrate 5 separately.

Optical fibers can preferably be employed as the light transmission medium 2. Also, Optical waveguides can preferably be employed as the light transmission media 2 and 21. Optical waveguides are formed by sandwiching a core having a rectangular cross section between clads. For optical waveguides, the clads and the core are stacked on the substrate 5 or the support member 35. Optical fibers are formed by surrounding a core having a circular cross section by a clad having a circular cross section. Such an optical fiber is mounted on the substrate 5. The schematic side views of FIGS. 1 to 6 are the same for both cases, where the core serves as the light transmission layer 3 and the clad serves as the support members 31 and 35.

In the mirror-embedded light transmission media 101 to 104 illustrated in FIGS. 1 to 4 respectively, the rough surface R terminates the light transmission layer 3 in such a manner that direction of the surface R is parallel to the light transmission direction (the horizontal direction in the figure) of the light transmission layer 3. In FIGS. 1 and 2, an end of the light transmission medium 2 formed on the substrate 5 is cut by means of, e.g., a dicing blade or the like in such a manner that the cut end surface is parallel to the light transmission direction, thereby forming the rough surface R. In FIGS. 3 and 4, a middle portion of the light transmission medium (2 or 21) continuously extending along the length of the substrate 5 or the support member 35 is cut out by dicing, laser processing or the like in such a manner that the cut surfaces are parallel to the light transmission direction, and thereby a rectangular groove 6 is formed and at least one of side walls of the groove 6 provides the rough surface R.

Besides, in the mirror-embedded light transmission media 101 and 103 of FIGS. 1 and 3 respectively, the reflection enhancing layer 4 is formed to be perpendicular to the light transmission layer 3 (the horizontal direction in the figure), and therefore a resonator such as a laser oscillator can be obtained by forming another mirror (not shown) in addition to the reflection enhancing layer 4.

In the mirror-embedded light transmission media 105 and 106 of FIGS. 5 and 6 respectively, the rough surface R terminates at least the light transmission layer 3 in such a manner that the surface R is oblique to the light transmission direction of the layer 3. In order to form this configuration, a middle portion of the light transmission medium (2 or 21) continuously extending along the length of the substrate 5 or the support member 35 is cut out by dicing using a V-shaped blade, laser processing or the like in such a manner that the cut surfaces are inclined with respect to the light transmission direction. Thus, a V-shaped groove 7 is formed and each of the cut surfaces of the groove 7 provides the rough surface R.

When the light transmission media 2 and 21 are made of a hard material, the resulting cut surface can be made relatively smooth (i.e., the surface roughness of the rough surface R can be made relatively small). By contrast, when the light transmission media 2 and 21 are made of a soft material (e.g., in the case of a flexible waveguide or a resin optical fiber), the resulting cut surface (and therefore the rough surface R) is very rough. While the present invention can be utilized irrespective of the hardness of the light transmission media 2 and 21, it is particularly effective in solving the problem of the poor reflection efficiency of the significantly rougher surface R. For example, the present invention is particularly effective when the modulus of elasticity of the light transmission layer 3 of the light transmission media 2 and 21 is less than 1 GPa.

The reflection enhancing layers 4 and 41 are made of a transparent material. Here, the transparent material must have a sufficiently high transmissivity to light (of a specific wavelength or a specific wavelength range or a broad wavelength range) that passes through the light transmission layer 3 in order to satisfy various required conditions such as maximum allowable transmission loss.

Ideally, the reflection enhancing layer (4 or 41) and the light transmission layer (core) 3 have the same refractive index; however, it is not necessarily essential that the refractive indices of these two layers are exactly the same. The larger the refractive index difference between the reflection enhancing layer (4 or 41) and the light transmission layer 3, the stronger light transmitted through the layer 3 is scattered at the interface between these two layers. However, even when the refractive index difference between the reflection enhancing layer (4 or 41) and the light transmission layer 3 is substantial, it is not necessarily a problem so long as the transmission loss due to light scattering is within an acceptable range. For example, when the refractive index difference between the reflection enhancing layer (4 or 41) and the light transmission layer 3 is within ±0.1, the transmission loss due to light scattering can be made sufficiently small. Still further, even when this refractive index difference is larger than ±0.1, it is not necessarily unacceptable so long as the refractive index of the reflection enhancing layer (4 or 41) is approximately the same as that of the support member (clad) 31 or 35.

The reflection enhancing layers 4 and 41 can be made of a thermoset resin or a photocurable resin. The reflection enhancing layers 4 and 41 can also be made of a thermoplastic resin. Generally speaking, the thermoset, photocurable and thermoplastic resins belong to types of adhesives. Specific methods for forming the reflection enhancing layers 4 and 41 will be described later.

In the mirror-embedded light transmission media 101 and 103 illustrated in FIGS. 1 and 3 respectively, the smooth surface S of the reflection enhancing layer (4 or 41) is formed to be parallel to the light transmission direction (the horizontal direction in the figure) of the light transmission layer 3. In this case, the smooth surface S serves as a mirror for reflecting light transmitted though the light transmission layer 3 back in the opposite direction.

In the mirror-embedded light transmission media 102 and 104 to 106 illustrated in FIGS. 2 and 4 to 6 respectively, the smooth surface S of the reflection enhancing layer (4 or 41) is formed to be oblique (but not perpendicular nor parallel) to the light transmission layer 3. In this case, the smooth surface S serves as a mirror for reflecting light transmitted though the light transmission layer 3 back in a direction oblique (or perpendicular) to the light transmission layer 3. For example, when the tilt angle of the smooth surface S with respect to the light transmission layer 3 is 45°, the light is reflected perpendicular to the light transmission layer 3.

In the mirror-embedded light transmission medium 106 illustrated in FIG. 6, the smooth surface S of the reflection enhancing layer 4 is covered with a light reflecting film 8 (a metal film or a multilayer film). Thus, a mirror with a light reflecting film is formed. In contrast, in the mirror-embedded light transmission media 101 to 105 illustrated in FIGS. 1 to 5 respectively, the smooth surface S of the reflection enhancing layer (4 or 41) serves as a mirror by itself without the addition of any light reflecting film. Such elimination of the light reflecting film is allowed because there is a sufficient refractive index difference between the reflection enhancing layer (4 or 41) and air. Needless to say, the mirror-embedded light transmission media 101 to 104 illustrated in FIGS. 1 to 4 respectively may further include such a light reflecting film 8 which covers the smooth surface S of the reflection enhancing layer (4 or 41).

(Fabrication Method of Mirror-Embedded Light Transmission Medium)

Next, methods for fabricating mirror-embedded light transmission media 101 to 106 will be described. As illustrated in FIGS. 7A to 14C, a fabrication method of a mirror-embedded light transmission medium according to the present invention includes: a cutting step P1 of forming, by means of a dicing blade or the like, the rough surface R for terminating at least the light transmission layer 3 (through which light is transmitted) in such a manner that a direction of the rough surface R is parallel or oblique to the light transmission direction of the light transmission layer 3; a layer adding step P2 of adherently covering the rough surface R with the reflection enhancing layer 4 or 41 (a surface roughness, i.e., many projections and depressions, of the rough surface R being filled with a reflection enhancing material); and a smoothing step P3 of forming over the reflection enhancing layer (4 or 41) the smooth surface S for reflecting light from the light transmission layer 3.

In the fabrication methods of FIGS. 7A to 12, the smoothing step P3 of forming the smooth surface S over the reflection enhancing layer (4 or 41) includes a shaping step P4 of shaping the reflection enhancing layer (4 or 41) by means of a shaping member (9, 91, 92 or 93) having a smooth surface SS. The smooth surface S is formed over the reflection enhancing layer (4 or 41) by forcing the smooth surface SS of the shaping member (9, 91, 92 or 93) against the reflection enhancing layer (4 or 41) before the layer (4 or 41) has been cured.

In the fabrication methods of FIGS. 7A to 11C, the smoothing step P3 of forming the smooth surface S over the reflection enhancing layer (4 or 41) includes a releasing step P5 of releasing the shaping member (9, 91 or 92) from the reflection enhancing layer (4 or 41). By contrast, in the case of the mirror-embedded light transmission medium 107 illustrated in FIG. 12, the fabrication method thereof does not include such a releasing step P5 and therefore the shaping member 93 is left in the mirror-embedded light transmission medium 107 with the shaping member 93 adhering to the reflection enhancing layer 4. FIG. 12 is a schematic illustration showing a cross-sectional view of a mirror-embedded light transmission medium according to still another embodiment of the present invention, in which a shaping member is not removed from the medium but remains as an integral part of the finished structure.

Figure 13:
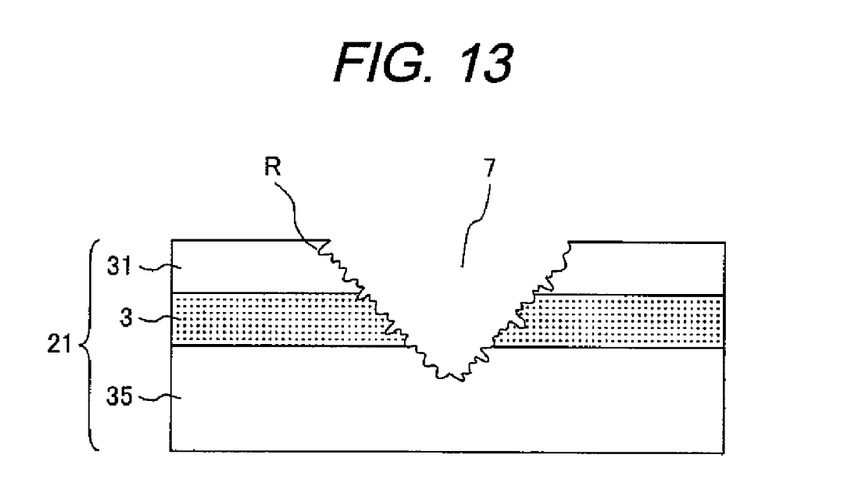
FIG. 13 is a schematic illustration showing a cross-sectional view of a light transmission medium in which a V-groove is cut out and a rough surface is formed in the V-groove.
Figure 14A:
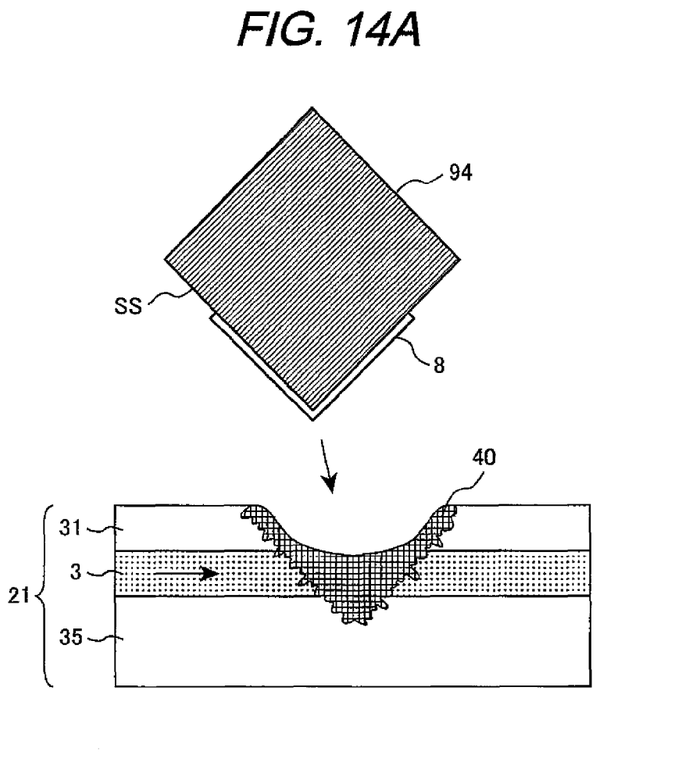
FIG. 14A is a schematic illustration showing a cross-sectional view representing a layer adding step of forming a reflection enhancing layer in a fabrication method of the light transmission medium of FIG. 6.
Figure 14B:
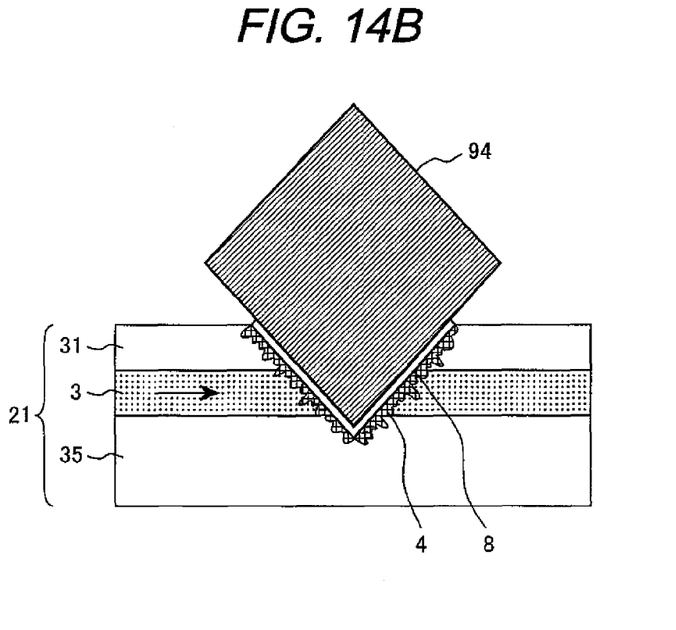
FIG. 14B is a schematic illustration showing a cross-sectional view representing a shaping step by means of a shaping member.
Figure 14C:
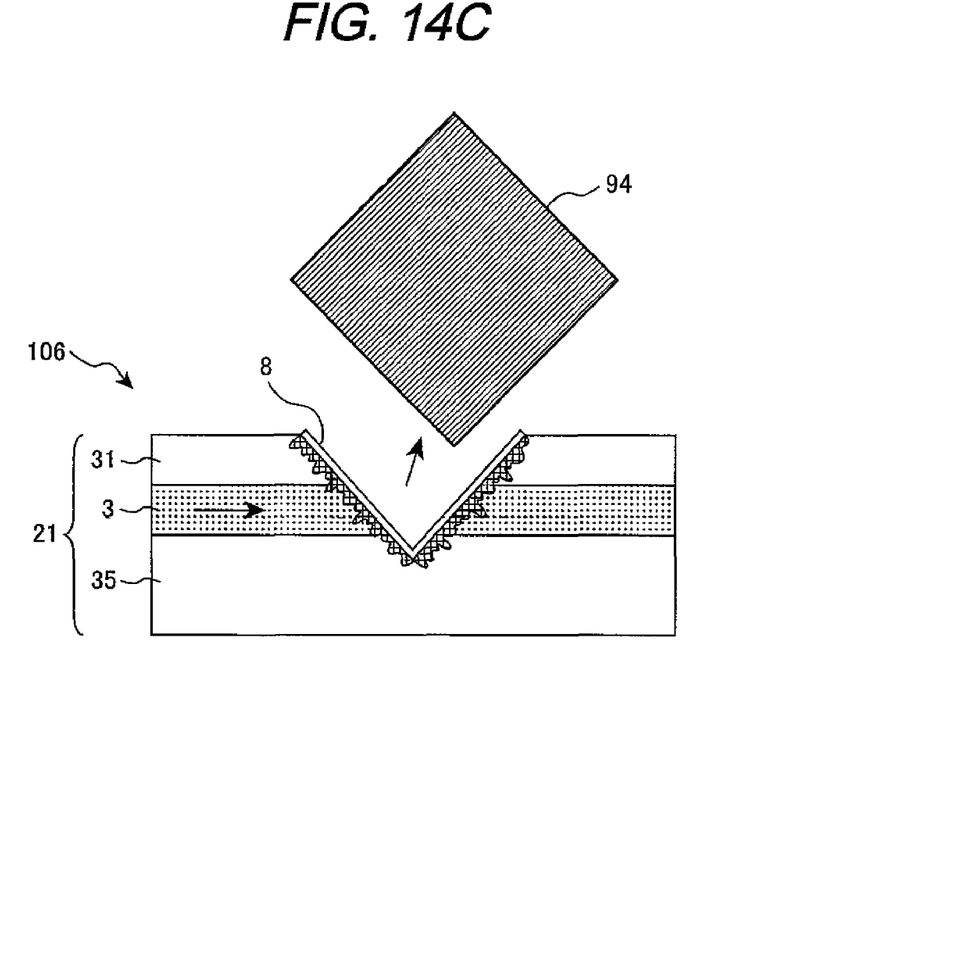
FIG. 14C is a schematic illustration showing a cross-sectional view representing a releasing step of releasing the shaping member.

In the fabrication methods of FIGS. 13 to 14C, the smoothing step P3 of forming the smooth surface S over the reflection enhancing layer 4 includes: a film holding step P6 of preparatorily holding the light reflecting film 8 over the smooth surface SS of the shaping member 94; a transfer step P7 of transferring the light reflecting film 8 to the smooth surface S of the reflection enhancing layer 4; and a releasing step P8 of releasing the shaping member 94 from the light reflecting film 8.

Each of these fabrication methods will be described below in more detail.

Figure 7A:
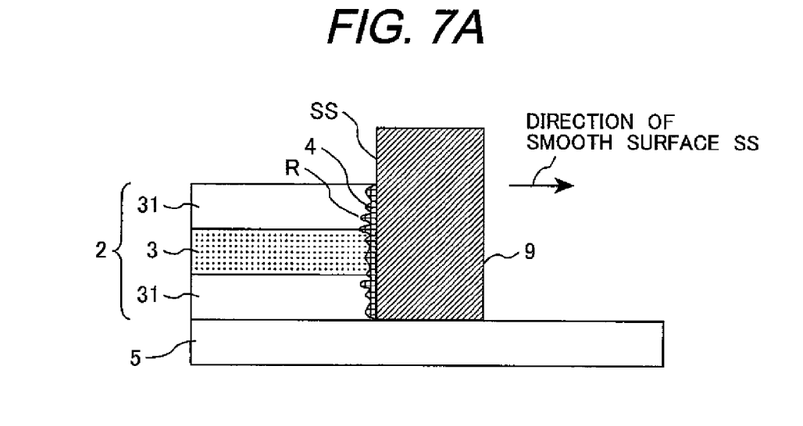
FIG. 7A is a schematic illustration showing a cross-sectional view representing a shaping step by means of a shaping member in a fabrication method of the mirror-embedded light transmission medium of FIG. 1.
Figure 7B:
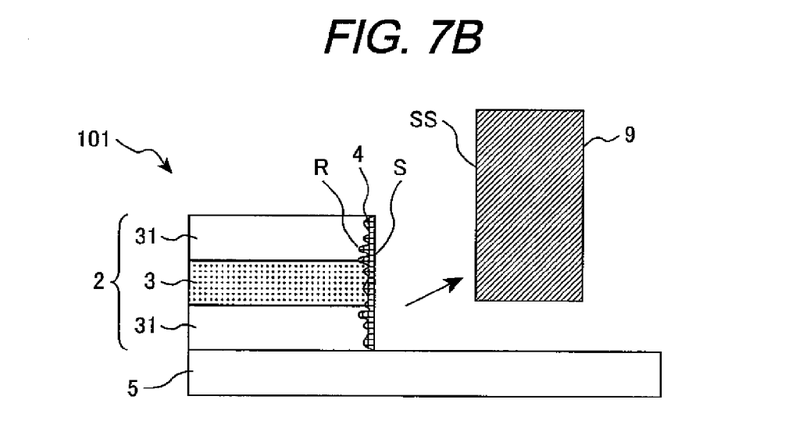
FIG. 7B is a schematic illustration showing a cross-sectional view representing a releasing step of releasing the shaping member.

FIG. 7A is a schematic illustration showing a cross-sectional view representing a shaping step by means of a shaping member in a fabrication method of the mirror-embedded light transmission medium of FIG. 1; and FIG. 7B is a schematic illustration showing a cross-sectional view representing a releasing step of releasing the shaping member. As illustrated in FIG. 7A, the light transmission medium 2 is mounted on the substrate 5 in such a manner that the light transmission layer 3 is parallel to the surface of the substrate 5. In the cutting step P1, an end of the light transmission medium 2 is cut by means of a dicing blade or the like in such a manner that a direction of the cut end surface is parallel to the light transmission direction, thereby forming the rough surface R. In the layer adding step P2, an uncured reflection enhancing material (a thermoset resin, a photocurable resin, or a thermoplastic resin), covers and tightly adheres to the rough surface R, thereby forming the reflection enhancing layer 4. At this point, the exposed surface (the surface opposite the interface with the rough surface R) of the reflection enhancing layer 4 is not flat but irregular; so, in the smoothing step P3 (the shaping step P4) the shaping member 9 is forced against the exposed surface.

The shaping member 9 is a square (or rectangular) solid rod. The shaping member 9 is made of a metal, glass or plastic. When a plastic is employed, it is preferably not softened by heat or light which is used to shape and cure the reflection enhancing material for the reflection enhancing layer 4. Also preferably, the shaping member 9 can be readily released from the reflection enhancing layer 4. A release agent such as fluorine compounds may be preapplied to the shaping member 9 to facilitate release from the reflection enhancing layer 4 in the later step.

The shaping member 9 has a smooth surface SS. The smooth surface SS of the shaping member 9 is then forced against the exposed surface of the reflection enhancing layer 4 in such a manner that a direction of the smooth surface SS is parallel to the light transmission direction of the light transmission layer 3, thereby shaping the surface of the layer 4.

As illustrated in FIG. 7B, after the reflection enhancing layer 4 is cured, the releasing step P5 is then performed. In the releasing step P5, the shaping member 9 is released from the reflection enhancing layer 4. Thus, the reflection enhancing layer 4 is shaped by the smooth surface SS of the shaping member 9, thereby forming the smooth surface S that is perpendicular to the surface of the substrate 5. In this manner, the fabrication of the mirror-embedded light transmission medium 101 of FIG. 1 is completed.

Besides, the shaping member 9 may be removed by dissolution in a solution instead of such a physical release. For example, a shaping member 9 made of a glass that can be dissolved in hydrogen fluoride is employed, and in the fabrication process, the shaping member 9 is removed by dissolution in hydrogen fluoride after the reflection enhancing layer 4 is cured. Also, a soluble plastic may be used for the shaping member 9. In this case, the shaping member 9 can be removed by dissolution in an organic solvent.

Figure 8:
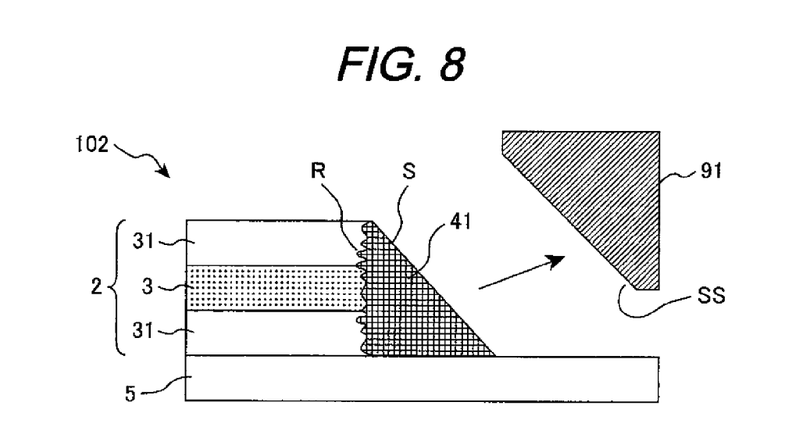
FIG. 8 is a schematic illustration showing a cross-sectional view representing a releasing step of releasing a shaping member in a fabrication method of the mirror-embedded light transmission medium of FIG. 2.

FIG. 8 is a schematic illustration showing a cross-sectional view representing a releasing step of releasing a shaping member in a fabrication method of the mirror-embedded light transmission medium of FIG. 2. This method is similar to the fabrication method of FIGS. 7A and 7B in which a rough surface R whose direction is parallel to the light transmission direction is formed in the cutting step P1. However, a shaping member 91 is not a rectangular rod but has an oblique smooth surface SS. In the smoothing step P3, by means of this shaping member 91, the smooth surface S of the reflection enhancing layer 41 is formed to be oblique to the light transmission direction of the light transmission layer 3 (the surface of the substrate 5).

Figure 9A:
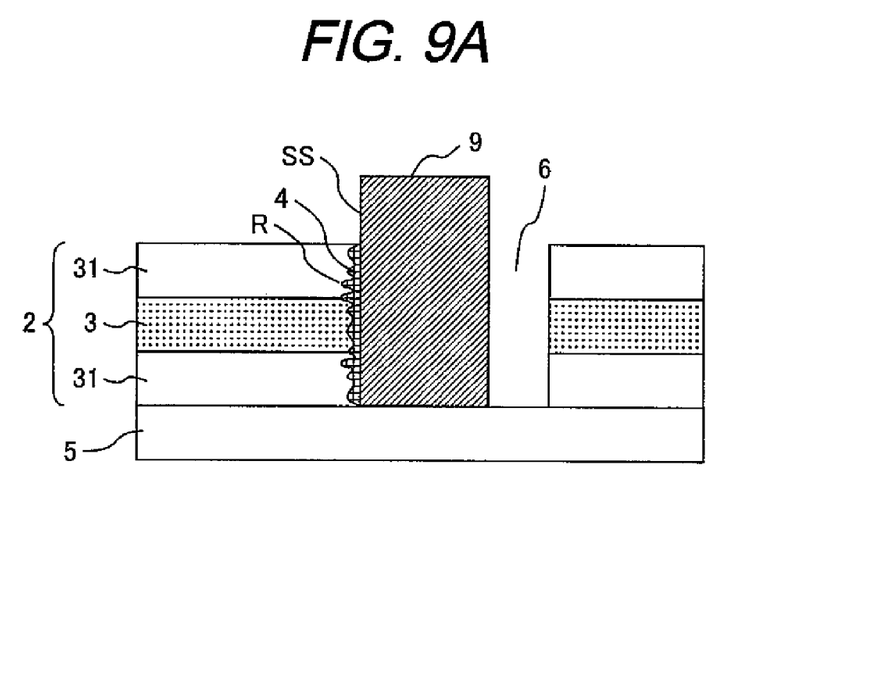
FIG. 9A is a schematic illustration showing a cross-sectional view representing a shaping step by means of a shaping member in a fabrication method of the mirror-embedded light transmission medium of FIG. 3.
Figure 9B:
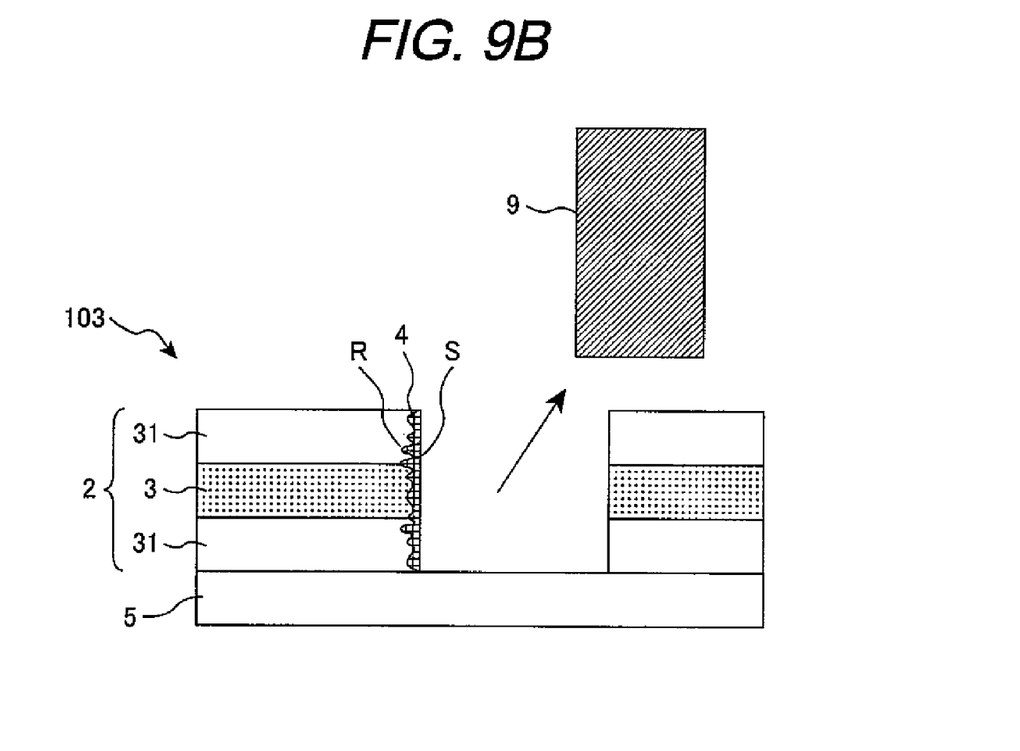
FIG. 9B is a schematic illustration showing a cross-sectional view representing a releasing step of releasing the shaping member.

FIG. 9A is a schematic illustration showing a cross-sectional view representing a shaping step by means of a shaping member in a fabrication method of the mirror-embedded light transmission medium of FIG. 3; and FIG. 9B is a schematic illustration showing a cross-sectional view representing a releasing step of releasing the shaping member. As illustrated in FIG. 9A, the light transmission medium 2 is mounted on the substrate 5 in such a manner that the light transmission layer 3 is parallel to the surface of the substrate 5. In the cutting step P1, a middle portion of the light transmission medium 2 continuously extending along the length of the substrate 5 is cut out in such a manner that directions of the cut side surfaces are parallel to the light transmission direction, and thereby a rectangular groove 6 is formed and at least one of the cut side surfaces of the groove 6 provides the rough surface R. In the layer adding step P2, an uncured reflection enhancing material covers and tightly adheres to the rough surface R, thereby forming the reflection enhancing layer 4. In the smoothing step P3 (the shaping step P4), the shaping member 9 (a rectangular rod) is inserted into the rectangular groove 6 and the smooth surface SS of the shaping member 9 is then forced against the exposed surface of the reflection enhancing layer 4 in such a manner that a direction of the smooth surface SS is parallel to the light transmission direction of the light transmission layer 3, thereby shaping the surface of the layer 4.

As illustrated in FIG. 9B, after the reflection enhancing layer 4 is cured, the releasing step P5 is then performed. In the releasing step P5, the shaping member 9 is released from the reflection enhancing layer 4 and is removed from the rectangular groove 6. Thus, the reflection enhancing layer 4 is shaped by the smooth surface SS of the shaping member 9, thereby forming the smooth surface S which is perpendicular to the surface of the substrate 5. In this manner, the fabrication of the mirror-embedded light transmission medium 103 of FIG. 3 is completed.

Figure 10A:
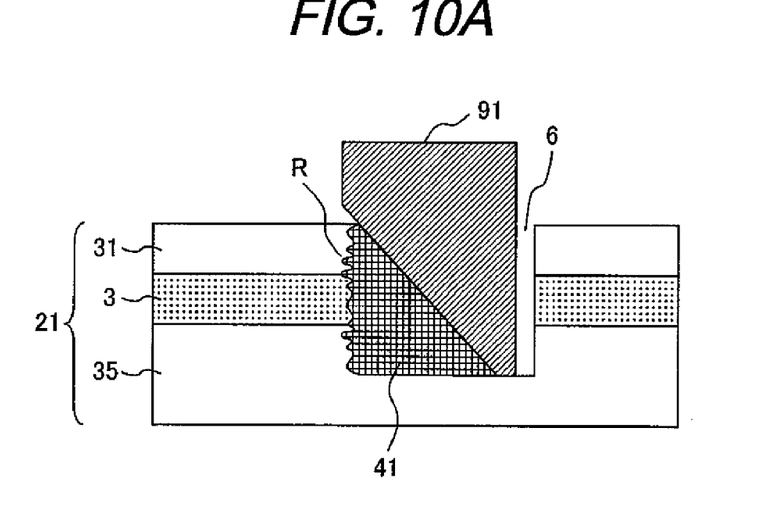
FIG. 10A is a schematic illustration showing a cross-sectional view representing a shaping step by means of a shaping member in a fabrication method of the mirror-embedded light transmission medium of FIG. 4.
Figure 10B:
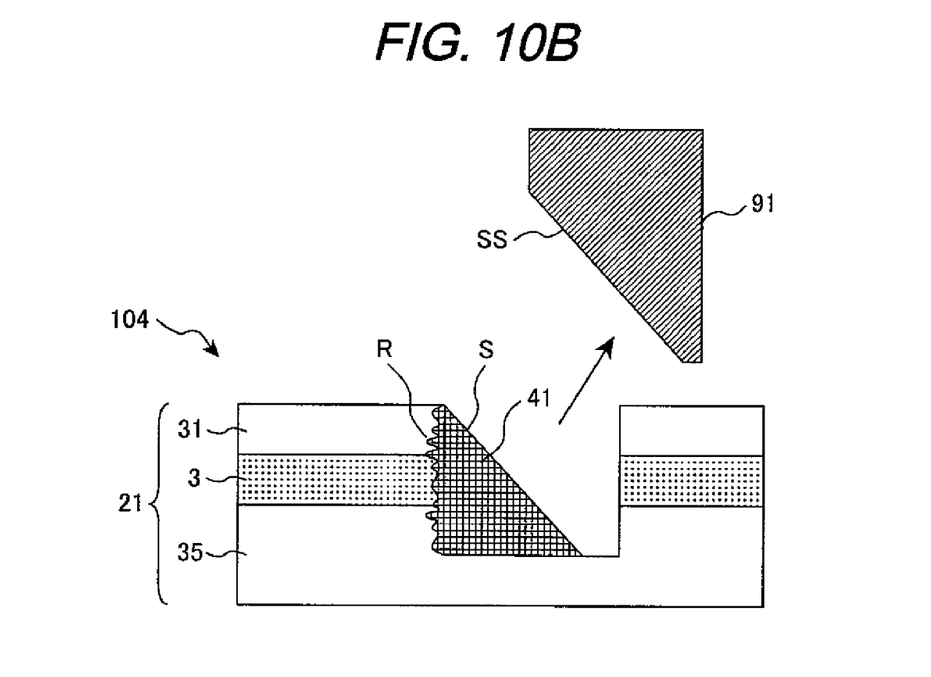
FIG. 10B is a schematic illustration showing a cross-sectional view representing a releasing step of releasing the shaping member.

FIG. 10A is a schematic illustration showing a cross-sectional view representing a shaping step by means of a shaping member in a fabrication method of the mirror-embedded light transmission medium of FIG. 4; and FIG. 10B is a schematic illustration showing a cross-sectional view representing a releasing step of releasing the shaping member. As illustrated in FIG. 10A, the light transmission medium 21 includes the substrate as a part of the support member 35 in such a manner that the light transmission layer 3 is parallel to the support member 35. In the cutting step P1, a middle portion of the light transmission medium 21 continuously extending along the length of the support member 35 is cut out in such a manner that directions of the cut side surfaces are parallel to the light transmission direction, and thereby a rectangular groove 6 is formed and at least one of the cut side surfaces of the groove 6 provides the rough surface R. In the layer adding step P2, an uncured reflection enhancing material covers and tightly adheres to the rough surface R, thereby forming the reflection enhancing layer 41.

In the smoothing step P3 (the shaping step P4), a shaping member 91, which has an oblique smooth surface SS, is inserted into the rectangular groove 6 and the smooth surface SS of the shaping member 91 is then forced against the exposed surface of the reflection enhancing layer 41 in such a manner that a direction of the smooth surface SS is oblique to the light transmission direction of the light transmission layer 3, thereby shaping the surface of the layer 41.

As illustrated in FIG. 10B, after the reflection enhancing layer 41 is cured, the releasing step P5 is then performed. In the releasing step P5, the shaping member 91 is released from the reflection enhancing layer 41 and is removed from the rectangular groove 6. Thus, the reflection enhancing layer 41 is shaped by the smooth surface SS of the shaping member 91, thereby forming the smooth surface S that is oblique to the light transmission direction of the light transmission layer 3. In this manner, the fabrication of the mirror-embedded light transmission medium 104 of FIG. 4 is completed.

Figure 11A:
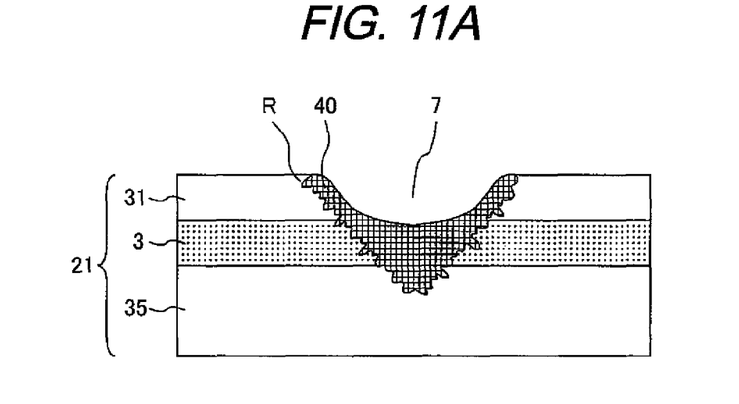
FIG. 11A is a schematic illustration showing a cross-sectional view representing a layer adding step of forming a reflection enhancing layer in a fabrication method of the mirror-embedded light transmission medium of FIG. 5.
Figure 11B:
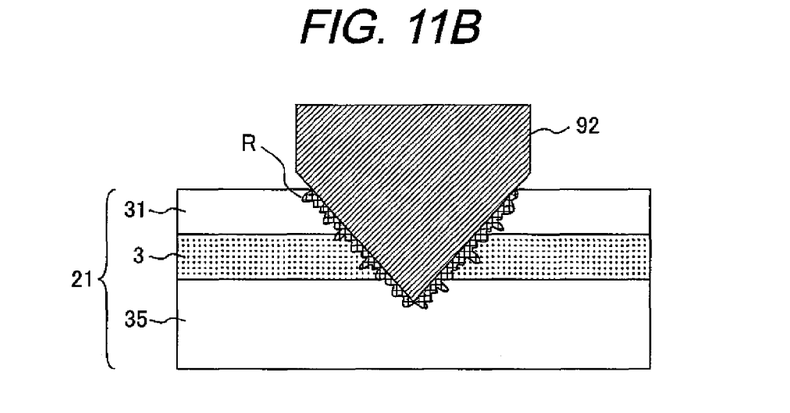
FIG. 11B is a schematic illustration showing a cross-sectional view representing a shaping step by means of a shaping member.
Figure 11C:
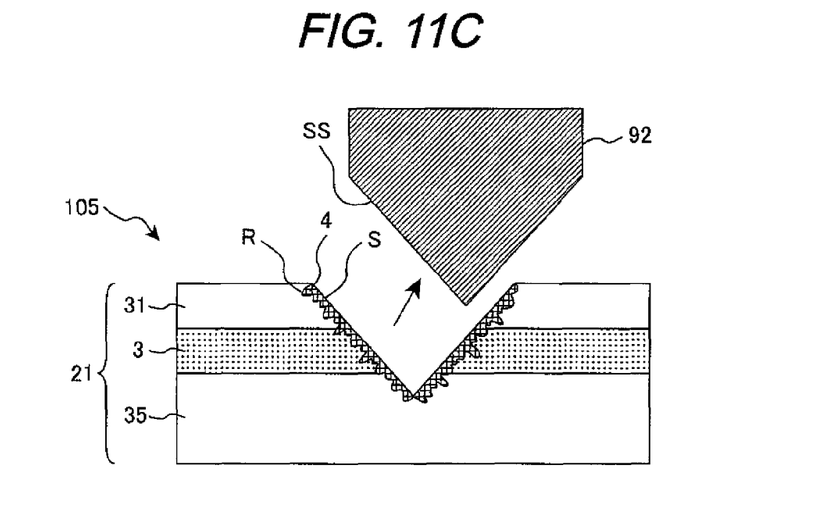
FIG. 11C is a schematic illustration showing a cross-sectional view representing a releasing step of releasing the shaping member.
Figure 12:
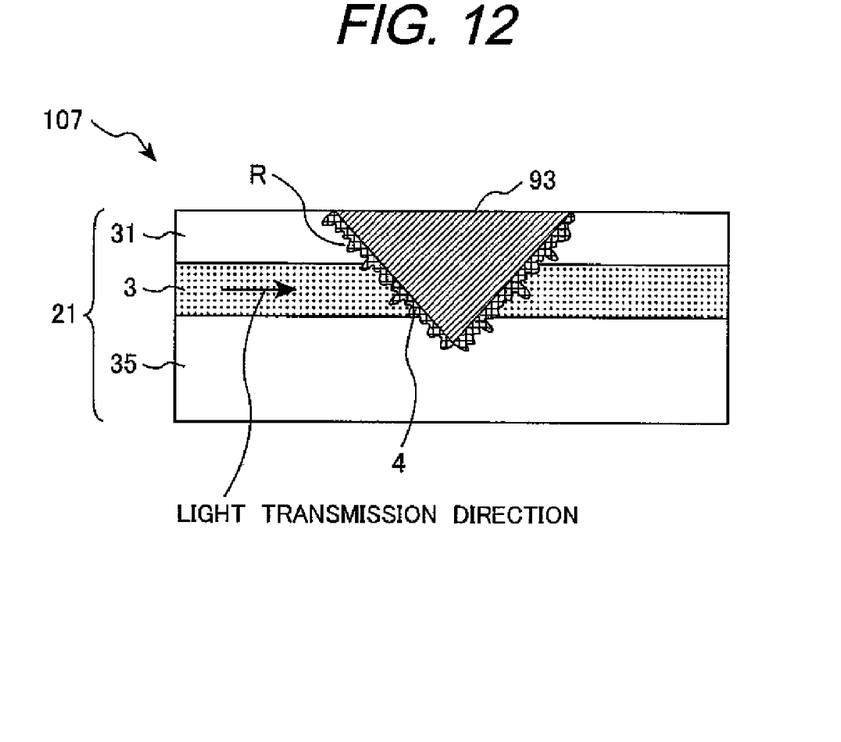
FIG. 12 is a schematic illustration showing a cross-sectional view of a mirror-embedded light transmission medium according to still another embodiment of the present invention, in which a shaping member is not removed from the medium but remains as an integral part of the finished structure.

FIG. 11A is a schematic illustration showing a cross-sectional view representing a layer adding step of forming a reflection enhancing layer in a fabrication method of the mirror-embedded light transmission medium of FIG. 5; FIG. 11B is a schematic illustration showing a cross-sectional view representing a shaping step by means of a shaping member; and FIG. 11C is a schematic illustration showing a cross-sectional view representing a releasing step of releasing the shaping member. As illustrated in FIG. 11A, the light transmission medium 21 includes the substrate as a part of the support member 35 in such a manner that the light transmission layer 3 is parallel to the support member 35. In the cutting step P1, a middle portion of the light transmission medium 21 continuously extending along the length of the support member 35 is cut out by means of, e.g., a dicing blade in such a manner that directions of the cut side surfaces are oblique to the light transmission direction, and thereby a V-shaped groove 7 is formed and each of the cut side surfaces of the groove 7 provides the rough surface R. In the layer adding step P2, an uncured reflection enhancing material (a thermoset resin, a photocurable resin, or a thermoplastic resin) covers and tightly adheres to the rough surface R, thereby forming an unshaped reflection enhancing layer 40. At this point, the exposed surface (the surface opposite the interface with the rough surface R) of the unshaped reflection enhancing layer 40 is not flat but irregular.

As illustrated in FIG. 11B, in the smoothing step P3 (the shaping step P4), a shaping member 92 is forced against the reflection enhancing layer 4. The shaping member 92 has a smooth surface SS whose direction is 45° oblique to the light transmission direction and therefore the reflection enhancing layer 4 can be provided with a smooth surface S whose direction is 45° oblique to the light transmission direction.

As illustrated in FIG. 11C, after the reflection enhancing layer 4 is cured, the releasing step P5 is then performed. In the releasing step P5, the shaping member 92 is released from the reflection enhancing layer 4. Thus, the reflection enhancing layer 4 is shaped by the smooth surface SS of the shaping member 92, thereby forming the smooth surface S whose direction is 45° oblique to the light transmission direction of the light transmission layer 3. In this manner, the fabrication of the mirror-embedded light transmission medium 105 of FIG. 5 is completed.

As mentioned before, in the fabrication method of the mirror-embedded light transmission medium 107 illustrated in FIG. 12, an uncured reflection enhancing material is adhered to the rough surfaces R of the V-shaped groove 7. Then, the reflection enhancing layer 4 is shaped by using the shaping member 93 and is cured. Thus, the fabrication of the mirror-embedded light transmission medium 107 is completed. In this case, the shaping member 93 is left in the mirror-embedded light transmission medium 107. The shaping member 93 preferably has a sufficiently high reflectivity for the light used.

FIG. 13 is a schematic illustration showing a cross-sectional view of a light transmission medium in which a V-groove is cut out and a rough surface is formed in the V-groove. As illustrated in FIG. 13, the light transmission medium 21 includes the substrate as a part of the support member 35 in such a manner that the light transmission layer 3 is parallel to the support member 35. In the cutting step P1, a middle portion of the light transmission medium 21 continuously extending along the length of the support member 35 is cut out by means of, e.g., a dicing blade in such a manner that directions of the cut side surfaces are oblique to the light transmission direction, and thereby a V-shaped groove 7 is formed and each of the cut side surfaces of the groove 7 provides the rough surface R.

FIG. 14A is a schematic illustration showing a cross-sectional view representing a layer adding step of forming a reflection enhancing layer in a fabrication method of the light transmission medium of FIG. 6; FIG. 14B is a schematic illustration showing a cross-sectional view representing a shaping step by means of a shaping member; and FIG. 14C is a schematic illustration showing a cross-sectional view representing a releasing step of releasing the shaping member. As illustrated in FIG. 14A, in the layer adding step P2, an uncured reflection enhancing material (a thermoset resin, a photocurable resin, or a thermoplastic resin) covers and tightly adheres to the rough surface R, thereby forming the unshaped reflection enhancing layer 40. At this point, the exposed surface of the unshaped reflection enhancing layer 40 is not flat but irregular.

In this method, a shaping member 94 is a square (or rectangular) solid rod, which is cut out from a silicon wafer for example. Then, a light reflecting film 8 (a metal film or a multilayer film) is adhered to the smooth surface SS of the shaping member 94. The material for the metal film includes gold, silver, aluminum and so on.

As illustrated in FIG. 14B, in the smoothing step P3 (the shaping step P4), the shaping member 94 is forced against the reflection enhancing layer 4. Thus, the light reflecting film 8 is sandwiched between the shaping member 94 and the reflection enhancing layer 4. Then, the reflection enhancing layer 4 is cured, resulting in adhesion (fixation) of the light reflecting film 8 to the reflection enhancing layer 4.

As illustrated in FIG. 14C, in the releasing step P5, the shaping member 94 is then released from the reflection enhancing layer 4. During this procedure, the light reflecting film 8 is detached from the shaping member 94 and is left over the reflection enhancing layer 4. Thus, the fabrication of the mirror-embedded light transmission medium 106 of FIG. 6 is completed.

The method for fabricating the mirror-embedded light transmission medium 106 of FIG. 6 is not necessarily limited to the fabrication method described with reference to FIGS. 13 through 14C. For example, the light reflecting film 8 may be formed, by metal film vapor deposition, coating and sintering (plating) of fine metal particles or other methods, over the smooth surface S of the reflection enhancing layer 4 of the mirror-embedded light transmission medium 105 of FIG. 5.

As described above, in each of the mirror-embedded light transmission media 101 to 107 according to the present invention, the light transmission medium (2 or 21) is cut out to form the rough surface R, which is then adherently covered with the reflection enhancing layer (4 or 41). Then, the reflection enhancing layer (4 or 41) is provided with the smooth surface S which can reflect light and therefore can serve as the reflective surface of the mirror. Thus, the mirror-embedded light transmission media 101 to 107 basically require no metal vapor deposition or masking, therefore allowing reduction in the manufacturing cost and also providing excellent mass productivity. Also, in the mirror-embedded light transmission media 101 to 107, the reflection enhancing layer (4 or 41) can be formed of a material having good adhesiveness to the light transmission medium, and therefore is less prone to peeling than vapor deposited films, thus providing excellent reliability.

In addition, when flexible optical waveguides and flexible optical fibers are cut by means of a dicing blade or the like, the resulting rough surface R is significantly rougher. Therefore, the present invention is particularly advantageous when forming such above-described mirrors in the light transmission medium (2 or 21) made of a soft material.

In many cases, optical waveguides and optical fibers requiring flexibility must be made of a material with a low modulus of elasticity. Unfortunately, the less the modulus of elasticity, the more difficult it is to form a smooth surface by cutting and therefore the rougher the resulting surface is. Hence, the present invention can be particularly advantageously applied to light transmission media made of materials with moduli of elasticity of less than 1 GPa.

Figure 15:
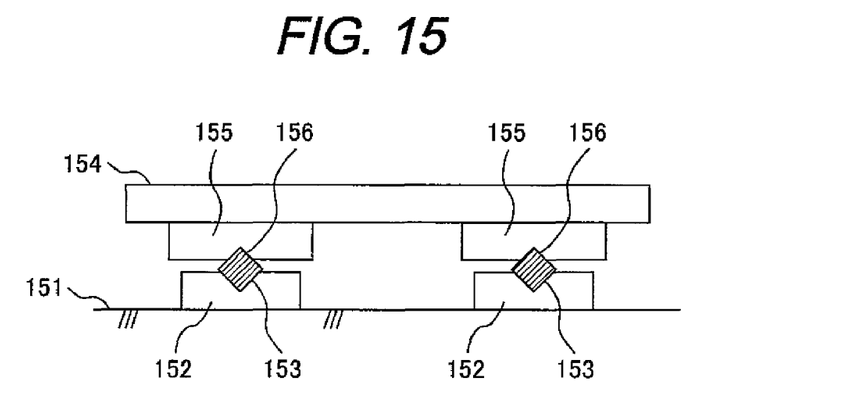
FIG. 15 is a schematic illustration showing a cross-sectional view representing a method for manufacturing a plurality of mirror-embedded light transmission media according to the present invention.

FIG. 15 is a schematic illustration showing a cross-sectional view representing a method for manufacturing a plurality of mirror-embedded light transmission media according to the present invention. That is suitable for mass production. As illustrated in FIG. 15, a plurality of light transmission media 152 of the present invention, in which an invented mirror is to be formed, is held on a base board 151. In each light transmission medium 152 is formed a V-groove 153, which is obtained by obliquely cutting the light transmission layer (not shown). A reflection enhancing layer (not shown) is formed over the surface of each V-groove 153.

A liftable board 154 is liftably and lowerably placed above and opposite the base board 151. The liftable board 154 is provided with a plurality of jig holders 155 which are positioned to face the corresponding light transmission media 152. Each jig holder 155 holds a jig 156 for shaping and smoothing the surface of the reflection enhancing layer of the corresponding light transmission medium 152. Each jig 156 is the shaping member (92 or 94) described in FIGS. 11 and 14. The shaping member used as the jig 156 varies depending on the groove shape of the light transmission medium 152 described with reference to FIGS. 1 through 14C. In addition, the substrate 5 may be used as the base board 161. Hence, this manufacturing method is also effective in forming a plurality of mirrors in a light transmission medium (or multiple light transmission media) mounted on one substrate.

By using this manufacturing method, a plurality of reflection enhancing layers can be simultaneously shaped in a batch. Moreover, all the jigs 156 are simultaneously pushed together into the V-grooves 153 of the respective light transmission media 152, and therefore each jig 156 is pushed into the corresponding V-groove 153 more symmetrically laterally (i.e., in the longitudinal direction of the medium 152). This prevents each jig 156 from tilting laterally. If the jig 156 tilts, the tilt angle of the smooth surface formed on the reflection enhancing layer becomes different from the designed value. As a consequence, if the designed tilt angle is 45° for example, the sum of the incident angle and the reflection angle deflects from 90°. However, this manufacturing method can prevent the jig 156 from tilting laterally and therefore the tilt angle of the smooth surface can be formed as designed.

EXAMPLES

A polymer waveguide, formed of epoxy clads (having a refractive index of 1.50 and a modulus of elasticity of 50

MPa) and an epoxy core (having an refractive index of 1.58 and a modulus of elasticity of approximately 1 GPa), was mounted on a polyimide substrate. Two V-grooves (spaced apart by 10 cm) were formed in the polymer waveguide by cutting by means of a 90° V-shaped cutting blade. The V-grooves were cut out by dicing from the waveguide, not from the polyimide substrate.

At first, the waveguide was measured for insertion loss before the V-groove had been shaped (i.e., before the reflection enhancing layer had been formed). A single mode fiber was placed outside the polyimide substrate and was optically coupled to a mirror surface of one V-groove (a first mirror surface). Light of 850 nm exiting from the fiber passed through the substrate, and entered the first mirror surface. The light reflected by the first mirror surface propagated through a 10 cm length of the core, was then reflected by a mirror surface of the other V-groove (a second mirror surface), and exited through the polyimide substrate. The exiting light was detected by a PD (photodiode). The resulting insertion loss was 8.5 to 9 dB. The transmission loss of the waveguide was 0.1 dB/cm. Therefore, assuming that the coupling losses with the fiber and the PD are both 0, the loss per mirror is calculated to be roughly 4 dB.

Further, the average surface roughness Ra of the mirror surface was measured. In the core region (i.e., in the light transmission layer region), the roughness in the thickness direction was 0.38 to 0.55 μm and that in the cutting direction was 0.17 to 0.5 μm. The clad region (i.e., in the support member region), whose modulus of elasticity was less than that of the core region, had a greater average surface roughness than the core region. This result showed that the core and clad regions of the mirror surface were not smoothly cut, and this surface roughness probably resulted in a large scattering loss at the mirror surface.

For a waveguide sample prepared in the same way as mentioned above, the mirror surface was shaped and a light reflecting film of gold was transferred thereon. A rectangular rod was cut out from a silicon wafer and gold was vapor deposited on the smooth surface of the silicon rod. The mirror surfaces of the waveguide sample were shaped using this rectangular rod. An epoxy thermoset resin having a refractive index of 1.56 was applied to each V-groove in an appropriate amount. The silicon rectangular rod was placed over each groove in such a manner that the gold film deposited on the smooth surface of the rod faced the exposed surface of the mirror formed in the groove when the rod was lowered into the groove. The two rectangular rods were held by respective jigs, on which was placed a liftable board extending the two rods. Then, a force of 500 gf was downwardly applied to the liftable board. Then, the thermoset resin was cured by heating at 150° C. for 1 hour. The rods were then removed from the V-grooves, and it was observed that the gold films on the rods were transferred onto the surfaces of the V-grooves. The insertion loss of the thus prepared waveguide sample was measured to be approximately 2.5 to 3 dB. Thus, it was confirmed that the loss per mirror was as low as less than 1 dB.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A mirror-embedded light transmission medium, comprising:
   a light transmission medium including a light transmission layer, light being transmitted through the light transmission layer;
   a rough surface which terminates the light transmission layer, a direction of the rough surface being parallel or oblique to a light transmission direction of the light transmission layer;
   a reflection enhancing layer that adherently covers the rough surface; and
   a smooth surface formed over the reflection enhancing layer, the smooth surface reflecting the light transmitted through the light transmission layer.

2. The mirror-embedded light transmission medium according to claim 1, wherein:
   the light transmission medium is mounted on a substrate in such a manner that the light transmission direction is parallel to a surface of the substrate.

3. The mirror-embedded light transmission medium according to claim 1, wherein:
   the direction of the rough surface is orthogonal to the rough surface and parallel to the light transmission direction of the light transmission layer.

4. The mirror-embedded light transmission medium according to claim 1, wherein:
   the direction of the rough surface is orthogonal to the rough surface and oblique to the light transmission direction of the light transmission layer.

5. The mirror-embedded light transmission medium according to claim 1, wherein:
   difference between the refractive index of the reflection enhancing layer and the refractive index of the light transmission layer is within ±0.1.

6. The mirror-embedded light transmission medium according to claim 1, wherein:
   the reflection enhancing layer is made of a thermoset resin or a photocurable resin.

7. The mirror-embedded light transmission medium according to claim 1, wherein:
   the reflection enhancing layer is made of a thermoplastic resin.

8. The mirror-embedded light transmission medium according to claim 1, further comprising:
   a light reflecting film that covers the smooth surface, the light reflecting film being a metal film or a multilayer film.

9. The mirror-embedded light transmission medium according to claim 1, wherein:
   the light transmission medium is an optical waveguide or an optical fiber.

10. The mirror-embedded light transmission medium according to claim 1, wherein:
    modulus of elasticity of the light transmission layer is 1 GPa or less.

11. A fabrication method of a mirror-embedded light transmission medium which comprises a light transmission layer for transmitting light therethrough, the method including the steps of:
    forming a rough surface for terminating the light transmission layer by cutting, a direction of the rough surface being parallel or oblique to a light transmission direction of the light transmission layer;
    forming a reflection enhancing layer that adherently covers the rough surface; and
    forming a smooth surface over the reflection enhancing layer, the smooth surface reflecting the light transmitted through the light transmission layer.

12. The fabrication method of the mirror-embedded light transmission medium according to claim 11, wherein the step of forming the smooth surface includes the step of:
   shaping the reflection enhancing layer by means of a shaping member having a smooth surface.

13. The fabrication method of the mirror-embedded light transmission medium according to claim 12, wherein the step of forming the smooth surface further includes the step of:
   removing the shaping member from the reflection enhancing layer.

14. The fabrication method of the mirror-embedded light transmission medium according to claim 12, wherein the step of forming the smooth surface further includes the steps of:
   preapplying a light reflecting film over the smooth surface of the shaping member;
   transferring the preapplied light reflecting film onto the exposed surface of the reflection enhancing layer; and
   removing the shaping member from the transferred light reflecting film.

15. A light transmission medium, comprising:
   a light transmission layer configured to transmit light therethrough in a light transmission direction, the light transmission layer terminating in a rough surface, wherein a direction orthogonal to the rough surface is disposed parallel or oblique to the light transmission direction of the light transmission layer;
   a reflection enhancing layer configured to adherently cover the rough surface; and
   a smooth surface formed over the reflection enhancing layer, the smooth surface configured to reflect light transmitted through the light transmission layer.

16. The light transmission medium according to claim 15, wherein:
   the direction of the rough surface is parallel to the light transmission direction of the light transmission layer.

17. The light transmission medium according to claim 15, wherein:
   the direction of the rough surface is oblique to the light transmission direction of the light transmission layer.

18. The light transmission medium according to claim 15, wherein at least one of:
   a difference between the refractive index of the reflection enhancing layer and the refractive index of the light transmission layer is within ±0.1, and
   a modulus of elasticity of the light transmission layer is 1 GPa or less.

19. The light transmission medium according to claim 15, wherein:
   the reflection enhancing layer includes at least one of: a thermoset resin, a photocurable resin, and a thermoplastic resin.

20. The light transmission medium according to claim 15, further comprising:
   a light reflecting film that covers the smooth surface, the light reflecting film including at least one of a metal film and a multilayer film.

* * * * *